(12) United States Patent
Wu et al.

(10) Patent No.: US 12,041,096 B2
(45) Date of Patent: Jul. 16, 2024

(54) IMAGE SHARING AND CONFERENCE PARTICIPANT IDENTIFICATION METHOD AND IMAGE SHARING AND CONFERENCE PARTICIPANT IDENTIFICATION SYSTEM CAPABLE OF PERFORMING BI-DIRECTIONAL COMMUNICATIONS AND PARTITIONING IMAGES

(71) Applicant: BENQ CORPORATION, Taipei (TW)

(72) Inventors: Chen-Chi Wu, Taipei (TW); Chia-Nan Shih, Taipei (TW); Chin-Fu Chiang, Taipei (TW); Jung-Kun Tseng, Taipei (TW); Chuang-Wei Wu, Taipei (TW)

(73) Assignee: BenQ Corporation, Taipei (TW)

( * ) Notice: Subject to any disclaimer, the term of this patent is extended or adjusted under 35 U.S.C. 154(b) by 201 days.

(21) Appl. No.: 17/584,347

(22) Filed: Jan. 25, 2022

(65) Prior Publication Data

US 2022/0303314 A1 Sep. 22, 2022

(30) Foreign Application Priority Data

Mar. 16, 2021 (TW) .................................. 110109280

(51) Int. Cl.
*G06F 15/16* (2006.01)
*H04L 65/1016* (2022.01)
*H04L 65/1069* (2022.01)

(52) U.S. Cl.
CPC ...... *H04L 65/1016* (2013.01); *H04L 65/1069* (2013.01)

(58) Field of Classification Search
CPC .................. H04L 65/1016; H04L 65/1069
See application file for complete search history.

(56) References Cited

U.S. PATENT DOCUMENTS

| 9,613,448 B1* | 4/2017 | Margolin | G06T 11/001 |
| 10,440,131 B2* | 10/2019 | Memon | H04W 4/024 |
| 11,005,988 B1* | 5/2021 | Patakokila | H04M 3/4286 |
| 2005/0030255 A1* | 2/2005 | Chiu | G06F 3/04883 |
| | | | 709/200 |

(Continued)

FOREIGN PATENT DOCUMENTS

| CN | 201491172 U | 5/2010 |
| CN | 107409162 A | 11/2017 |

OTHER PUBLICATIONS

Microsoft TEAMS—Technical guidance for WFP Executive Board virtual meetings, Sep. 14, 2020, p. 1-3, XP055944734, Sep. 14, 2020.

*Primary Examiner* — Oleg Survillo

(57) ABSTRACT

An image sharing and conference participant identification method includes providing a first multimedia adapter device and a second multimedia adapter device, generating a link control signal after the first multimedia adapter device is triggered, transmitting the link control signal from the first multimedia adapter device to the second multimedia adapter device directly or through a server according to a link list, establishing a link between the first multimedia adapter device and the second multimedia adapter device, and transmitting first image data from the first multimedia adapter device to the second multimedia adapter device through the link for integrating the first image data and second image data by the second multimedia adapter device to generate sharing image data.

19 Claims, 7 Drawing Sheets

(56) References Cited

U.S. PATENT DOCUMENTS

| | | | |
|---|---|---|---|
| 2006/0199612 A1* | 9/2006 | Beyer | H04M 1/72466 |
| | | | 455/556.2 |
| 2011/0117886 A1* | 5/2011 | Travis | H04L 65/403 |
| | | | 455/412.2 |
| 2011/0205329 A1 | 8/2011 | Willis | |
| 2014/0201400 A1 | 7/2014 | Beel | |
| 2016/0261648 A1 | 9/2016 | Ruetschi | |
| 2017/0048686 A1* | 2/2017 | Chang | H04W 52/0209 |
| 2018/0316893 A1* | 11/2018 | Rosenberg | H04N 7/152 |
| 2019/0236631 A1* | 8/2019 | Schwartz | G06F 16/29 |
| 2020/0314385 A1* | 10/2020 | Kang | H04N 7/147 |
| 2022/0286314 A1* | 9/2022 | Meyer | H04N 7/147 |
| 2023/0091539 A1* | 3/2023 | Lan | H04L 65/403 |
| | | | 348/14.09 |

* cited by examiner

IMAGE SHARING AND CONFERENCE
PARTICIPANT IDENTIFICATION METHOD
AND IMAGE SHARING AND CONFERENCE
PARTICIPANT IDENTIFICATION SYSTEM
CAPABLE OF PERFORMING
BI-DIRECTIONAL COMMUNICATIONS AND
PARTITIONING IMAGES

BACKGROUND OF THE INVENTION

1. Field of the Invention

The present invention illustrates an image sharing and conference participant identification method and an image sharing and conference participant identification system, and more particularly, an image sharing and conference participant identification system capable of performing bi-directional communications and partitioning images.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. Ina first mode, a specific software program has to be installed in computers operated by members participating in a conference meeting. The computer can identify several hardware components such as a hard disk, a universal serial bus (USB), and a compact disc-read only memory (CD-ROM) device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, conference reporting systems can use wireless communications technologies for increasing operational efficiency.

Further, functions of sharing conference images attract more and more attention in recent years, especially in the discussion of multi-party meetings by using shared images displayed on one screen. In a remote conference for multi-users, user's private registration information may be incorrect. For example, a user can register a conference server account by using data of a Google account or data of Facebook account. However, the Google account or the Facebook account can be counterfeited or cannot be identified by other persons. In other words, in the remote conference for multi-users, if at least one user's identity cannot be identified by other users, an efficiency of the conference discussion would be greatly reduced since identity information of a speaker is unidentified. Further, data security of registering unidentified accounts is also reduced.

SUMMARY OF THE INVENTION

In an embodiment of the present invention, an image sharing and conference participant identification method is disclosed. The method comprises providing a first multimedia adapter device and a second multimedia adapter device, generating a link control signal after the first multimedia adapter device is triggered, transmitting the link control signal from the first multimedia adapter device to the second multimedia adapter device directly or through a server according to a link list, establishing a link between the first multimedia adapter device and the second multimedia adapter device, and transmitting first image data from the first multimedia adapter device to the second multimedia adapter device through the link for integrating the first image data and second image data by the second multimedia adapter device to generate sharing image data.

In another embodiment of the present invention, an image sharing and conference participant identification system is disclosed. The system comprises a first multimedia adapter device, a second multimedia adapter device coupled to the first multimedia adapter device, a first display coupled to the first multimedia adapter device, and a second display coupled the second multimedia adapter device. After the first multimedia adapter device is triggered, a link control signal is generated. The first multimedia adapter device transmits the link control signal to the second multimedia adapter device directly or through a server according to a link list. A link between the first multimedia adapter device and the second multimedia adapter device is generated. The first multimedia adapter device transmits first image data to the second multimedia adapter device through the link for integrating the first image data and second image data by the second multimedia adapter device to generate sharing image data displayed on the second display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
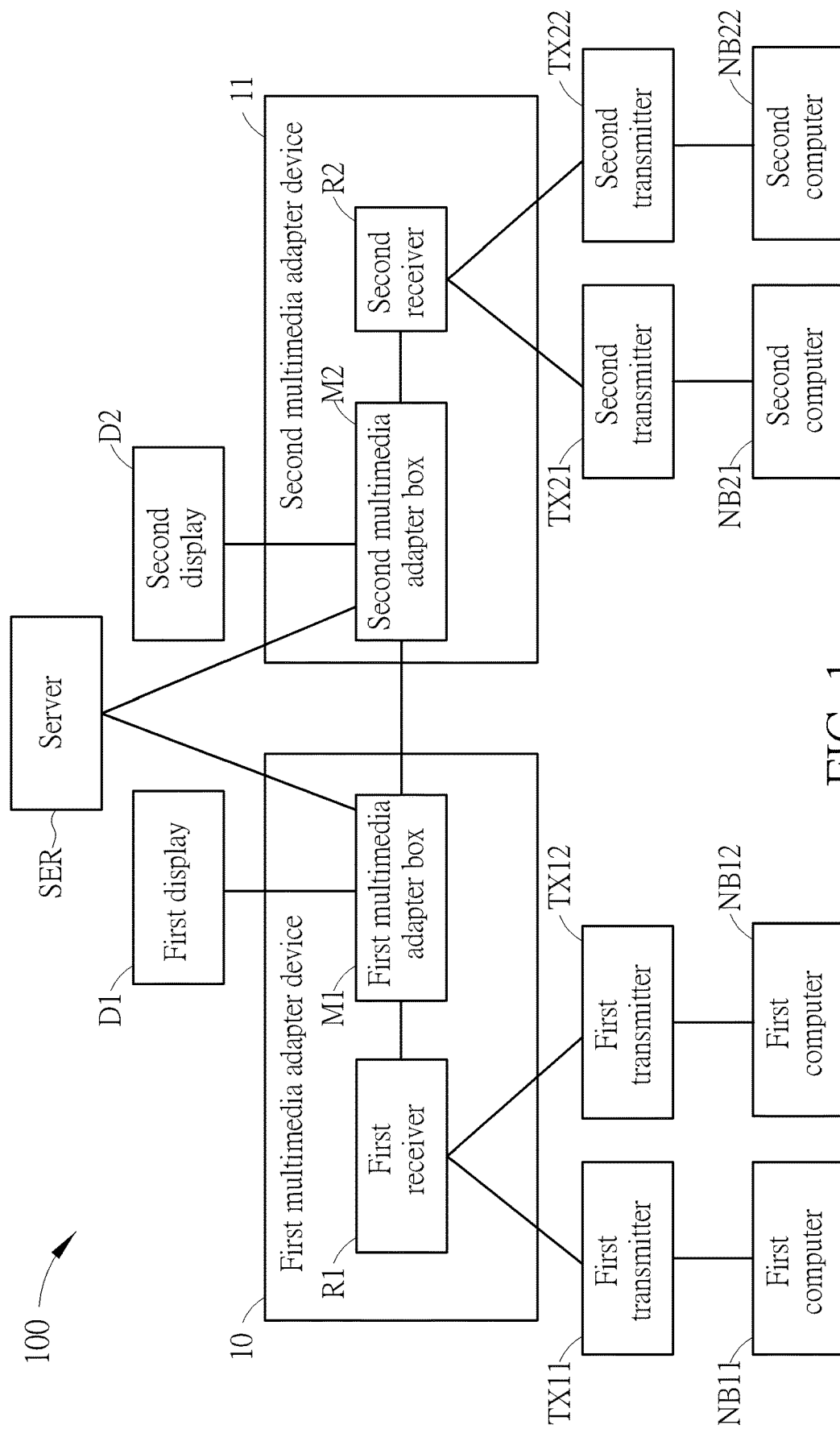
FIG. 1 is a block diagram of an image sharing and conference participant identification system according to an embodiment of the present invention.

FIG. 1 is a block diagram of an image sharing and conference participant identification system 100 according to an embodiment of the present invention. The image sharing and conference participant identification system. 100 includes a first multimedia adapter device 10, a second multimedia adapter device 11, a first display D1, and a second display D2. The second multimedia adapter device 11 is coupled to the first multimedia adapter device 10 through a wired or wireless link (i.e., a Wi-Fi link). The first display D1 is coupled to the first multimedia adapter device 10. The second display D2 is coupled the second multimedia adapter device 11. In the image sharing and conference participant identification system 100, after the first multimedia adapter device 10 is triggered, a link control signal can be generated. The first multimedia adapter device 10 transmits the link control signal to the second multimedia adapter device 11 directly or through a server SER according to a link list. Then, a link between the first multimedia adapter device 10 and the second multimedia adapter device 11 can be generated. After the link between the first multimedia adapter device 10 and the second multimedia adapter device 11 is established, the first multimedia adapter device 10 can transmit first image data to the second multimedia adapter device 11 through the link for integrating the first image data and second image data by the second multimedia adapter device 11 to generate sharing image data displayed on the second display D2. Further, after the link between the first multimedia adapter device 10 and the second multimedia adapter device 11 is established, the second multimedia adapter 11 can also transmit the second image data to the first multimedia adapter device 10 through the link. Therefore, the first multimedia adapter device 10 can integrate the first image data and second image data for generating sharing image data displayed on the first display D1. In other words, the image sharing and conference participant identification system 100 is capable of performing bi-directional communications. Further, the image sharing and conference participant identification system 100 is capable of performing an image partitioning function, a conference participant identification function, and a voice notification function. Details are illustrated later.

In the image sharing and conference participant identification system 100, as shown in FIG. 1, the first multimedia adapter device 10 can include a first receiver R1 and a first multimedia adapter box M1. The first receiver R1 can communicate with the first multimedia adapter box M1 through a Universal Serial Bus (USB) port and a High Definition Multimedia Interface (HDMI) port. The USB port supports transmissions of a control signal packet. The HDMI port supports transmissions of a multimedia signal packet. Further, the first receiver R1 can also communicate with the first multimedia adapter box M1 through a USB-Type C port. The USB-Type C port supports transmissions of the control signal packet and the multimedia signal packet. Further, the first receiver R1 can also communicate with the first multimedia adapter box M1 through a video channel. The video channel supports the transmissions of the multimedia signal packet and the control signal packet embedded in the multimedia signal packet. Any reasonable communication technology between the first receiver R1 and the first multimedia adapter box M1 falls into the scope of the present invention. The first receiver R1 can be linked to at least one first transmitter. For example, the first receiver R1 can be linked to the first transmitters TX11 and TX12. The first transmitter TX11 can be linked to a first computer NB11. The first transmitter TX12 can be linked to a first computer NB12. Similarly, the second multimedia adapter device 11 can include a second receiver R2 and a second multimedia adapter box M2. Communication methods between the second receiver R2 and the second multimedia adapter box M2 are similar to communication methods between the first receiver R1 and the first multimedia adapter box M1. Thus, they are omitted here. The second receiver R2 can be linked to at least one second transmitter. For example, the second receiver R2 can be linked to the second transmitters TX21 and TX22. The second transmitter TX21 can be linked to a second computer NB21. The second transmitter TX22 can be linked to a second computer NB22. The server SER can be linked to the first multimedia adapter box M1 and the second multimedia adapter box M2. The server SER can be any third-party server, such as a mail server, an authentication server, or a query server.

Figure 2:
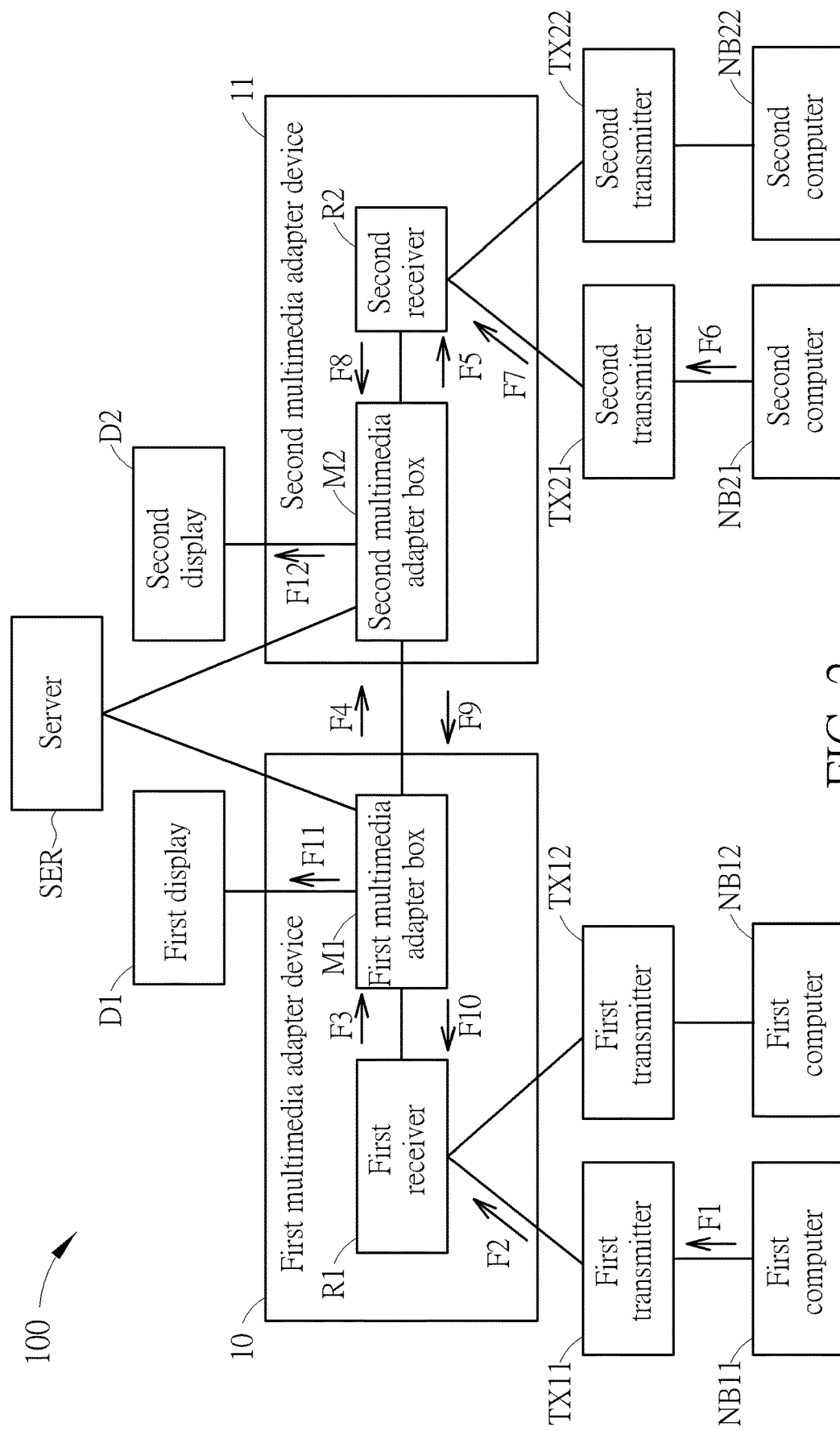
FIG. 2 is an illustration of transmitting signals of the image sharing and conference participant identification system in FIG. 1.
Figure 3:
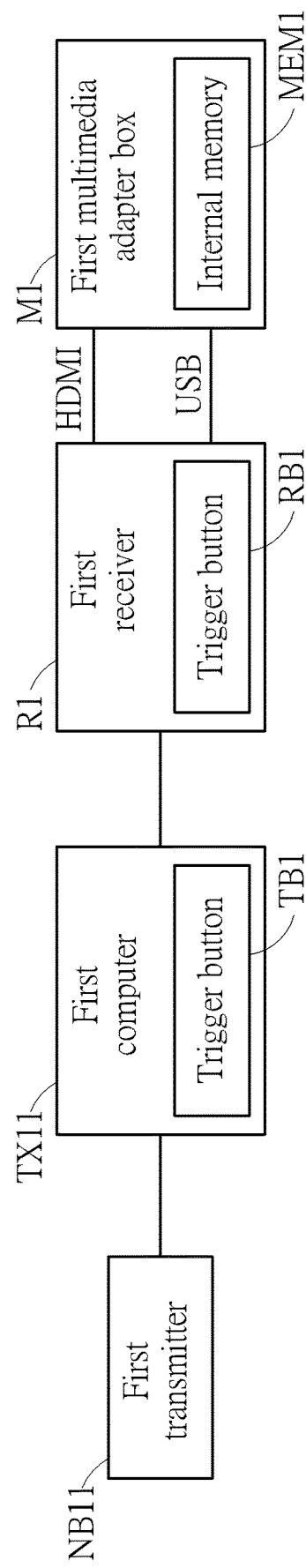
FIG. 3 is an illustration of transmitting data among a first computer, a first transmitter, a first receiver, and a first multimedia adapter box of the image sharing and conference participant identification system in FIG. 1.

FIG. 2 is an illustration of transmitting signals of the image sharing and conference participant identification system 100. FIG. 3 is an illustration of transmitting data among the first computer NB11, the first transmitter TX11, the first receiver R1, and the first multimedia adapter box M1 of the image sharing and conference participant identification system 100. After the first receiver R1 or at least one first transmitter TX11, TX12 coupled to the first receiver R1 is triggered, the first receiver R1 can generate a first control signal. For example, the first transmitter TX11 includes a trigger button TB1. The first receiver R1 includes a trigger button RB1. The first transmitter TX11 or the first receiver R1 can use the trigger button TB1 or the trigger button RB1 for enabling a one-touch-active connection function. After the first control signal is generated by the first receiver R1, the first control signal can be transmitted from the first receiver R1 to the first multimedia adapter box M1 through a path F3 (a first link of the USB). Then, the first multimedia adapter box M1 can acquire the link list from an internal memory MEM1 or the server SER for generating the link control signal. The link list may include network addresses or network name of the second multimedia adapter device 11. After an Internet Protocol (IP) address of the second multimedia adapter device 11 is acquired by the first multimedia adapter box M1, the first multimedia adapter box M1 can transmit a link establishment request to the second multimedia adapter device 11 through a path F4. Further, the first multimedia adapter box M1 can establish a link between the first multimedia adapter device 10 and the second multimedia adapter device 11 by using the server SER. Then, the first multimedia adapter device 10 and the second multimedia adapter device 11 can be controlled synchronously.

After the link between the first multimedia adapter device 10 and the second multimedia adapter device 11 is established, the first computer NB11 can use the first transmitter TX11 for transmitting the first image data to the first receiver R1 through a path F1 and a path F2. The first receiver R1 can transmit the first image data to the first multimedia adapter box M1 through a second link (i.e., such as an HDMI channel, a path F3). The first multimedia adapter box M1 can transmit the first image data to the second multimedia adapter box M2 of the second multimedia adapter device 11 through a path F4. Therefore, the second receiver R2 can also receive the first image data through a path F5. Similarly, after the first multimedia adapter device 10 and the second multimedia adapter device 11 are linked, the second computer NB21 can use the second transmitter TX21 for transmitting the second image data to the second receiver R2 through a path F6 and a path F7. The second receiver R2 can transmit the second image data to the second multimedia adapter box M2 through a path F8. The second multimedia adapter box M2 can transmit the second image data to the first multimedia adapter box M1 of the first multimedia switching device 10 through a path F9. Therefore, the first receiver R1 can also receive the second image data through a path F10. Therefore, the image sharing and conference participant identification system 100 supports bi-directional communications. The first multimedia adapter box M1 and the second multimedia adapter box M2 can receive the first image data and the second image data. Therefore, the first multimedia adapter box M1 can display sharing image data including the first image data and the second image data on the first display D1 through a path F11. The second multimedia adapter box M2 can display another sharing image data including the first image data and the second image data on the second display D2 through a path F12.

Further, the image sharing and conference participant identification system 100 can also support bi-directional communications of control signals. For example, after a link between the first multimedia adapter device 10 and the second multimedia adapter device 11 is established, the first transmitter TX11 can transmit a first control signal to the second multimedia adapter device 11 through the first multimedia adapter device 10 (i.e., through the USB channel). After the second multimedia adapter device 11 receives the first control signal, the second multimedia adapter device 11 can perform media operations according to the first control signal. Similarly, after the link between the first multimedia adapter device 10 and the second multimedia adapter device 11 is established, the second transmitter TX21 can transmit a second control signal to the first multimedia adapter device 10 through the second multimedia adapter device 11 (i.e., through the USB channel). After the first multimedia adapter device 11 receives the second control signal, the first multimedia adapter device 10 can perform media operations according to the second control signal.

As previously mentioned, the image sharing and conference participant identification system 100 can support bi-directional communications of control signals and media signals. Therefore, the image sharing and conference participant identification system 100 can use control signals for selecting a particular multimedia signal to be displayed. For example, after the link between the first multimedia adapter device 10 and the second multimedia adapter device 11 is established, link statuses of at least one first transmitter (TX11 and TX12) and at least one second transmitter (TX21 and TX22) can be displayed on the first display D1 coupled to the first multimedia adapter device 10. After the second multimedia adapter device 11 receives the first control signal, media data of the second transmitter TX21 can be selected from at least one second transmitter TX21, TX22. Therefore, the media data of the second transmitter TX21 can be transmitted to the first multimedia adapter device 10 through the second multimedia adapter device 11. Similarly, the first multimedia adapter device 10 can also select media data of the first transmitter TX11 according to the second control signal transmitted from the second multimedia adapter device 11. Since the image sharing and conference participant identification system 100 supports bi-directional communications of control signals and media signals, operation flexibility can be improved.

Figure 4:
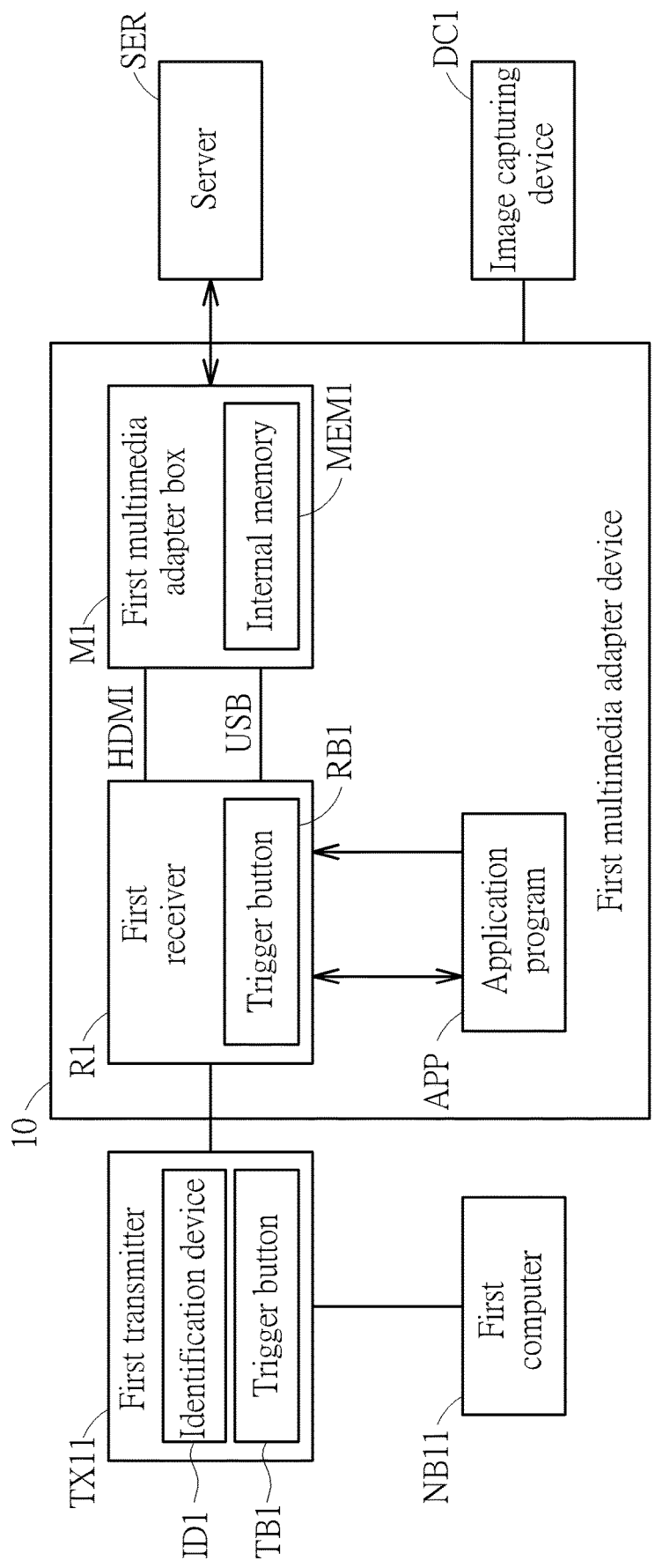
FIG. 4 is an illustration of acquiring identity information of conference participants by a first multimedia adapter device through a software program and a server of the image sharing and conference participant identification system in FIG. 1.

FIG. 4 is an illustration of acquiring identity information of conference participants by the first multimedia adapter device 10 through a software program APP and the server SER of the image sharing and conference participant identification system 100. The first transmitter TX11 may also include an identification device ID1. The identification device ID1 can be any device capable of identifying personal identity, such as a card reader, a near field communication (NFC) sensor device, or a fingerprint reader. The first transmitter TX11 can use the identification device ID1 for generating a first identification signal (i.e., for example, a card number). The first transmitter TX11 can transmit the first identification signal to the first receiver R1 and the first multimedia adapter box M1. After authorization is acquired, the application APP can access the first identification signal. Then, the application APP can control the first multimedia adapter box M1 for transmitting the first identification signal (i.e., for example, the card number) to the server SER for verifying if the first identification signal is valid. The server SER can be an authorization server (i.e., an Active Directory Server) for identifying the first identity signal of at least one first conference participant. The server SER can generate identification results corresponding to the first identification signal (i.e., for example, the card number, a company name, and/or an email address) to the first multimedia adapter device 10. Therefore, the first multimedia adapter device 10 can integrate the sharing image with the identity information of the identified first conference participants. Similarly, at least one second transmitter TX21, TX22 can transmit a second identification signal to the server SER through the second multimedia adapter device 11 for identifying the second identity signal of at least one second conference participant. Further, since the image sharing and conference participant identification system 100 is capable of performing bi-directional communications, the first multimedia adapter device 10 can also receive the second identity signal of at least one second conference participant through the server SER. Therefore, the first identity signal of the at least one first conference participant and the second identity signal of the at least one second conference participant can be integrated with the sharing image data.

Further, in the image sharing and conference participant identification system 100, it is not limited to use the server SER for identifying conference participants. For example, at least one first transmitter (TX11) coupled to the first multimedia adapter device 10 can transmit a first request signal to at least one first computer (NB11). Then, the at least one first computer can transmit first identity information of the at least one first conference participant to the at least one first transmitter for identifying the first identity information of the at least one first conference participant by the at least one first transmitter. Similarly, at least one second transmitter (TX21) coupled to the second multimedia adapter device 11 can transmit a second request signal to at least one second computer (NB21). Then, the at least one second computer can transmit second identity information of the at least one second conference participant to the at least one second transmitter for identifying the second identity information of the at least one second conference participant by the at least one second transmitter.

As previously mentioned, the image sharing and conference participant identification system 100 is capable of performing bi-direction communications. Therefore, after the first multimedia adapter device 10 and the second multimedia adapter device 11 are synchronized, the first identity information of the at least one first conference participant and the second identity information of the at least one second conference participant can be displayed on the first display D1 coupled to the first multimedia adapter device 10. Similarly, the first identity information of the at least one first conference participant and the second identity information of the at least one second conference participant can be displayed on the second display D2 coupled to the second multimedia adapter device 11. Further, "identity information of the conference participants" can also be generated by a software program. For example, the first identity information of the at least one first conference participant can be generated by executing a first software program installed in at least one first computer. The second identity information of the at least one second conference participant can be generated by executing a second software program installed in at least one second computer. The first identity information and the second identity information can include user login information. The second identity information can be transmitted to the first multimedia adapter device 10 through the second multimedia adapter device 11.

Figure 5:
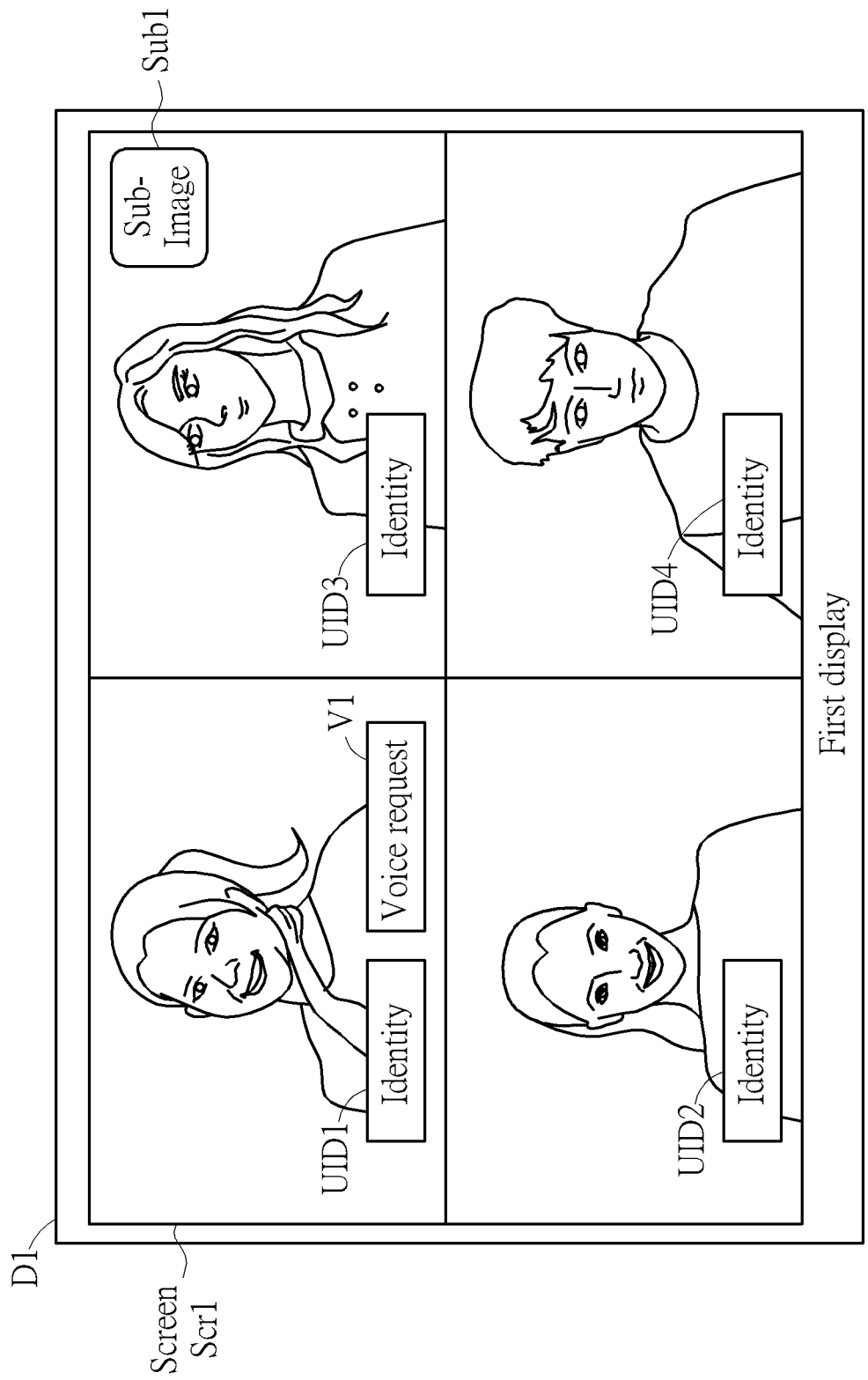
FIG. 5 is an illustration of displaying images, identity information, voice request, and sub-images of all conference participants on a first display of the image sharing and conference participant identification system in FIG. 1.

FIG. 5 is an illustration of displaying images, identity information, a voice request, and sub-images of all conference participants on the first display D1 of the image sharing and conference participant identification system 100. In the image sharing and conference participant identification system 100, a voice notification function can be performed, as illustrated below. After the first transmitter TX11 of at least one first transmitter coupled to the first multimedia adapter device 10 is triggered, a voice request signal can be generated. Then, the voice request signal can be transmitted from the first transmitter TX11 to the first multimedia adapter device 10. After the first multimedia adapter device 10 and the second multimedia adapter device 11 are synchronized, a voice notification message can be embedded to a visualized location image of at least one conference participant according to the voice request signal. For example, as shown in FIG. 5, a screen Scr1 of the first display D1 can display the identities UID1 to UID4 of the four conference participants under a text mode or an icon mode. When a conference participant corresponding to the identity UID1 triggers the first transmitter TX11 for requesting a speak authority, a voice request V1 can also be displayed on the screen Scr1 of the conference participant with the identity UID1 under the text mode or the icon mode. Therefore, images displayed on the screen Scr1 can be used for clearly distinguishing the different identities of the conference participants and the participants currently transmitting a speaking voice signal. Thus, an efficiency of a conference discussion process can be improved. Further, in the image sharing and conference participant identification system 100, since the image sharing and conference participant identification system 100 supports bi-directional communications, when the first transmitter TX11 is triggered for generating a voice notification message on the screen Scr1, the second multimedia adapter device 11 can transmit the second control signal to the first transmitter TX11 through the first multimedia adapter device 10. Then, the first transmitter TX11 can enable a multimedia transceiver according to the second control signal, such as a microphone. Further, as shown in FIG. 4, an image capturing device DC1 can establish a link with the first multimedia adapter device 10. The image capturing device DC1 can acquire an image of a conference room. Then, the image capturing device DC1 can transmit the image of the conference room to the first multimedia adapter device 10. Then, the first multimedia adapter device 10 can control the first display D1 for displaying a sub-image Sub1 of the image of the conference room. The sub-image Sub1 can be transmitted to the second multimedia adapter device 11. As shown in FIG. 5, the screen Scr1 of the first display D1 can display the identities UID1 to UID4 of the conference participants and the voice request V1. The screen Scr1 of the first display D1 can further display a real-time image of the conference room, such as the sub-image Sub1. Further, after the link between the image capturing device DC1 and the first multimedia adapter device 10 is established, when a request signal of the second transmitter TX21 is authorized, the sub-image can be transmitted to the second display D2.

Figure 6:
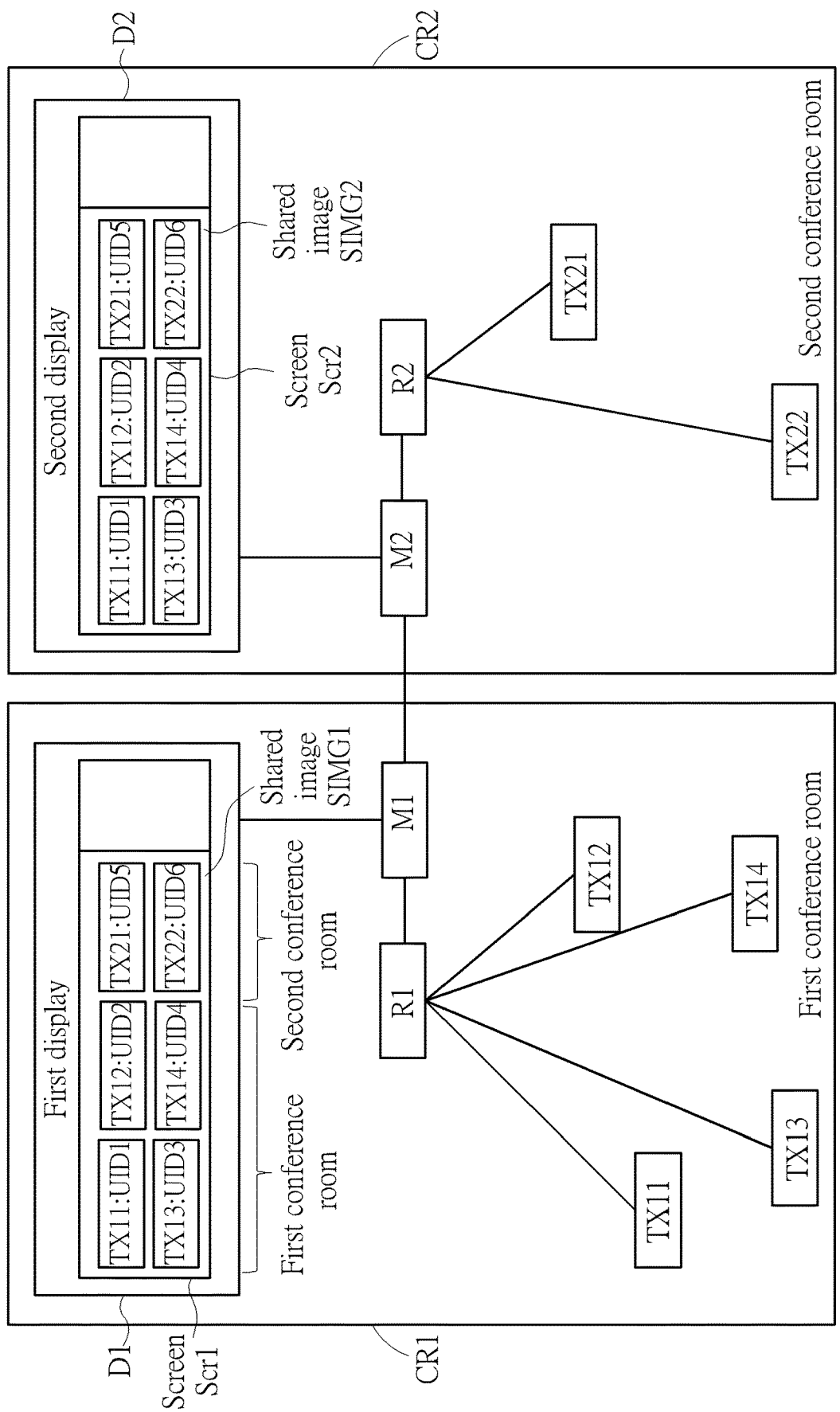
FIG. 6 is an illustration of displaying a visualized location image on the first display and a second display according to first position information of a first transmitter disposed inside of a first conference room and second position information of a second transmitter disposed inside of a second conference room of the image sharing and conference participant identification system in FIG. 1.

FIG. 6 is an illustration of displaying a visualized location image on the first display D1 and the second display D2 according to first position information of the first transmitters TX11 to TX14 disposed inside of a first conference room CR1 and second position information of the second transmitters TX21 to TX22 disposed inside of a second conference room CR2 of the image sharing and conference participant identification system 100. As shown in FIG. 6, in the first conference room CR1, at least one first transmitter coupled to the first multimedia adapter device 10 can broadcast a first position signal. For example, the transmitters TX11 to TX14 can broadcast four first position signals by using Ultra-Wideband (UWB) network. The first multimedia adapter device 10 can detect a first position of the at least one first transmitter according to at least one first position signal. For example, the first receiver R1 in the first multimedia adapter device 10 can detect four first positions of the first transmitters TX11 to TX14 according to the four first position signals. Similarly, in the second conference room CR2, at least one second transmitter coupled to the second multimedia adapter device can broadcast a second position signal. For example, the transmitters TX21 to TX22 can broadcast two second position signals by using UWB network. The second multimedia adapter device 11 can detect a second position of the at least one second transmitter according to at least one second position signal. For example, the second receiver R2 in the second multimedia adapter device 11 can detect two second positions of the second transmitters TX21 to TX22 according to the two second position signals. Further, information of the first position and the second position can be embedded into the sharing image data for generating the visualized location image of at least one conference participant. For example, on the screen Scr1 of the first display D1 of the first conference room CR1, the real-time first positions of the first devices TX11 to TX14 can be denoted as: TX11: UID1, TX12:UID2, TX13:UID3, and TX14:UID4. On the screen Scr2 of the second display D2 of the second conference room CR2, the real-time second positions of the second devices TX21 to TX22 can be denoted as: TX21:UID5 and TX22:UID6. Further, the screen Scr1 and the screen Scr2 can simultaneously display relative positions corresponding to conference participant identities of all transmitters disposed inside the first conference room CR1 and the second conference room CR2. Therefore, when the members in the first conference room CR1 obtain the shared image SIMG1, they can readily understand the location distribution of the first conference participants and the second conference participants. Similarly, when the members in the second conference room CR2 obtain the shared image SIMG1, they can readily understand the location distribution of the first conference participants and the second conference participants.

As previously illustrated, the image sharing and conference participant identification system 100 can detect a position of each conference participant and generate a voice notification message displayed on the screen. Therefore, the image sharing and conference participant identification system 100 can be further optimized for reducing interference of other noise or voice. For example, after the first transmitter TX11 of the at least one first transmitter is triggered, if the voice request signal is authorized, the image sharing and conference participant identification system 100 can block other first transmitters for avoiding inputting voice signals. In other words, only one speaker of all conference participants can speak at the same time. Thus, voice interference during a voice discussion process can be reduced.

Further, in the image sharing and conference participant identification system 100, "human voice" information can be analyzed and recognized from the media signals for automatically generating a voice notification message. For example, the first multimedia adapter device 10 can receive a multimedia signal transmitted from at least one first transmitter. Then, the first multimedia adapter device 10 can analyze the multimedia signal for determining if the multimedia signal includes the human voice information. Further, when the multimedia signal includes the human voice information, it implies that the human voice is inputted to the first transmitter TX11. Therefore, the image sharing and conference participant identification system 100 can generate the voice notification message. Then the voice notification message can be transmitted to a visualized location image of the at least one conference participant. Thus, the image sharing and conference participant identification system 100 can automatically generate the voice notification message, thereby leading to high efficiency of the conference discussion process.

Further, the image sharing and conference participant identification system 100 can also use a notification signal for informing users if a link is successfully established. For example, after the link control signal is transmitted from the first multimedia adapter device 10 to the second multimedia adapter device 11 directly or through the server SER, the first multimedia adapter device 10 can generate the notification signal. Then, the first multimedia adapter device 10 can transmit the notification signal to at least one second receiver coupled to the second multimedia adapter device 11. After the at least one second receiver receives the notification signal, when the at least one second receiver is triggered, the link between the first multimedia adapter device 10 and the second multimedia adapter device 11 can be established. Further, the notification signal can include a voice notification signal and/or a light notification signal. In other words, in order to increase operational efficiency and security, the image sharing and conference participant identification system 100 can use the notification signal for informing users to confirm link statuses before the link between the first multimedia adapter device 10 and the second multimedia adapter device 11 is established. Any hardware or technology modification falls into the scope of the present invention.

Figure 7:
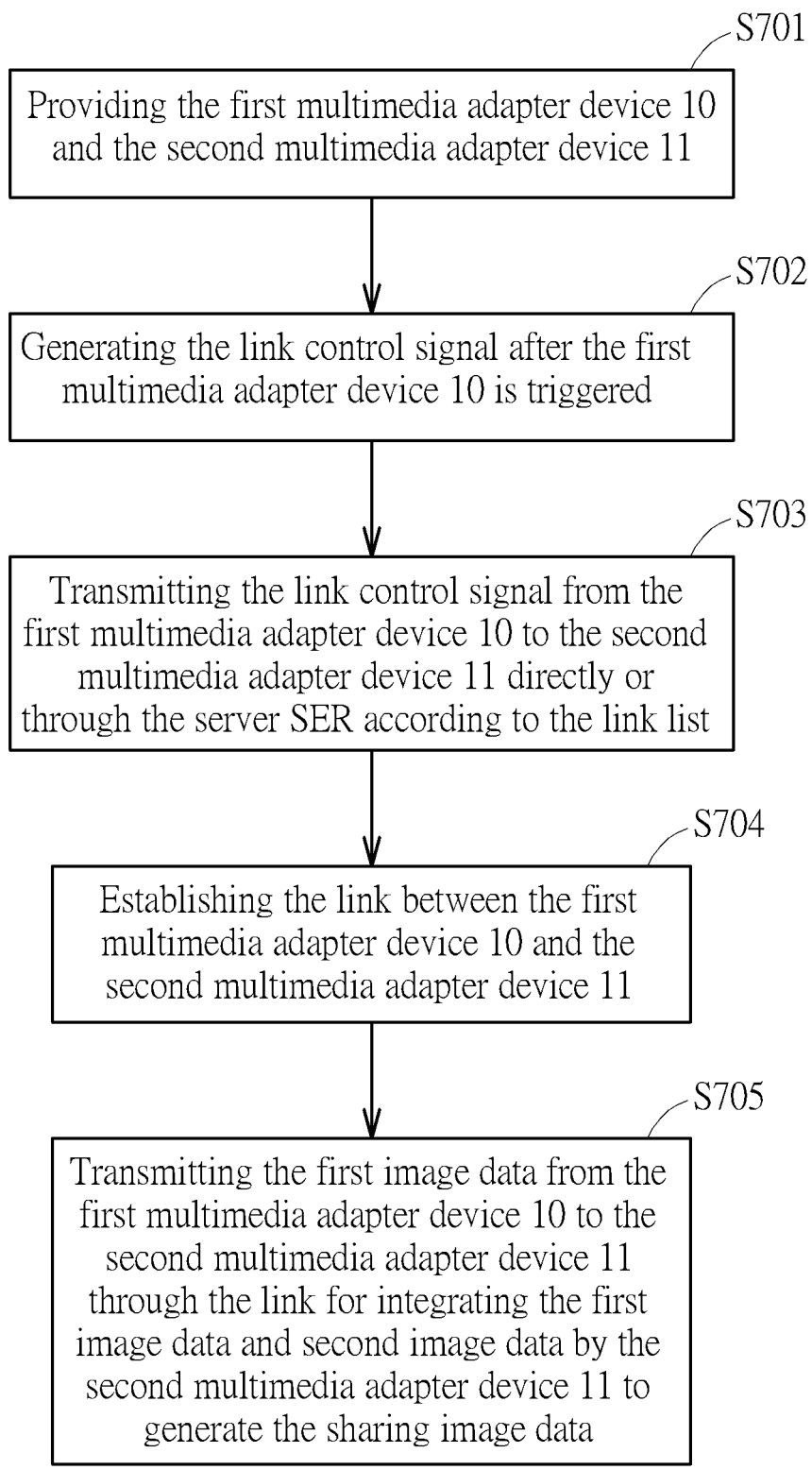
FIG. 7 is a flow chart of performing an image sharing and conference participant identification method by the image sharing and conference participant identification system in FIG. 1.

FIG. 7 is a flow chart of performing an image sharing and conference participant identification method by the image sharing and conference participant identification system 100. The image sharing and conference participant identification method includes step S701 to step S705. Step S701 to step S705 are illustrated below.

step S701: providing the first multimedia adapter device 10 and the second multimedia adapter device 11;
step S702: generating the link control signal after the first multimedia adapter device 10 is triggered;
step S703: transmitting the link control signal from the first multimedia adapter device 10 to the second multimedia adapter device 11 directly or through the server SER according to the link list;
step S704: establishing the link between the first multimedia adapter device 10 and the second multimedia adapter device 11;
step S705: transmitting the first image data from the first multimedia adapter device 10 to the second multimedia adapter device 11 through the link for integrating the first image data and second image data by the second multimedia adapter device 11 to generate the sharing image data.

Details of step S701 to step S705 are illustrated. Thus, they are omitted here. Since the image sharing and conference participant identification system 100 is capable of performing bi-directional communications, the sharing image data can be shared with at least two participants of the conference rooms. Further, the at least two participants of the conference rooms can control specific media data by using the bi-directional communications. Further, the image sharing and conference participant identification system 100 is capable of performing a voice notification function and a position detection function. Therefore, the image sharing and conference participant identification system 100 can increase the efficiency of the conference process.

To sum up, the present invention discloses an image sharing and conference participant identification system. The image sharing and conference participant identification system is capable of performing the bi-directional communications of media signals and control signals. Since the image sharing and conference participant identification system is capable of performing the bi-directional communications of media signals and control signals, the sharing image data and identity information of at least one conference participant can be shared with other conference participants. Further, since the image sharing and conference participant identification system is capable of performing a voice notification function and a position detection function, it can increase the efficiency of the conference process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sharing and conference participant identification method comprising:
   generating a link control signal after a first multimedia adapter device is triggered;
   transmitting the link control signal from the first multimedia adapter device to a second multimedia adapter device directly or through a server according to a link list;
   establishing a link between the first multimedia adapter device and the second multimedia adapter device;
   transmitting first image data from the first multimedia adapter device to the second multimedia adapter device through the link for integrating the first image data and second image data by the second multimedia adapter device to generate sharing image data;
   broadcasting a first position signal by at least one first transmitter coupled to the first multimedia adapter device;
   detecting a first position of the at least one first transmitter by the first multimedia adapter device according to the first position signal;

broadcasting a second position signal by at least one second transmitter coupled to the second multimedia adapter device;
detecting a second position of the at least one second transmitter by the second multimedia adapter device according to the second position signal;
embedding information of the first position and the second position to the sharing image data for generating a visualized location image of at least one conference participant;
generating a voice request signal after a first transmitter of the at least one first transmitter is triggered;
transmitting the voice request signal from the at least one first transmitter to the first multimedia adapter device; and
synchronizing the first multimedia adapter device and a second multimedia adapter device for embedding a voice notification message to the visualized location image according to the voice request signal;
wherein the first multimedia adapter device comprises a first receiver and a first multimedia adapter box, the second multimedia adapter device comprises a second receiver and a second multimedia adapter box, the at least one first transmitter and the first multimedia adapter device are disposed inside a first conference room, the at least one second transmitter and the second multimedia adapter device are disposed inside a second conference room, and the sharing image data is shared with participants of the first conference room and the second conference room by using bi-directional communications.

2. The method of claim 1, further comprising:
generating a first control signal after the first receiver or the at least one first transmitter coupled to the first receiver is triggered;
transmitting the first control signal from the first receiver to the first multimedia adapter box through a first link;
acquiring the link list from an internal memory of the first multimedia adapter box or from the server for generating the link control signal; and
acquiring an Internet Protocol (IP) address of the second multimedia adapter device by the first multimedia adapter box, or establishing the link between the first multimedia adapter device and the second multimedia adapter device by using the server.

3. The method of claim 2, wherein the first receiver communicates with the first multimedia adapter box through a Universal Serial Bus (USB) port and a High Definition Multimedia Interface (HDMI) port, the USB port supports transmissions of a control signal packet, the HDMI port supports transmissions of a multimedia signal packet, or the first receiver communicates with the first multimedia adapter box through a USB-Type C port, the USB-Type C port supports transmissions of the control signal packet and the multimedia signal packet, or the first receiver communicates with the first multimedia adapter box through a video channel, and the video channel supports the transmissions of the multimedia signal packet and the control signal packet embedded in the multimedia signal packet.

4. The method of claim 2, further comprising:
transmitting the first image data from a first transmitter of the at least one first transmitter to the first receiver;
transmitting the first image data from the first receiver to the first multimedia adapter box through a second link;
transmitting the first image data from the first multimedia adapter box to the second multimedia adapter box disposed inside the second multimedia adapter device; and
displaying the sharing image data on a second display by using the second multimedia adapter box.

5. The method of claim 1, further comprising:
integrating the first image data and second image data received by the second multimedia adapter device for generating another sharing image data by the first multimedia adapter device.

6. The method of claim 1, further comprising:
transmitting a first control signal from a first transmitter to the second multimedia adapter device through the first multimedia adapter device after the link between the first multimedia adapter device and the second multimedia adapter device is established; and
receiving the first control signal by the second multimedia adapter device for performing media operation according to the first control signal.

7. The method of claim 6, further comprising:
displaying link statuses of the at least one first transmitter and the at least one second transmitter on a first display coupled to the first multimedia adapter device after the link between the first multimedia adapter device and the second multimedia adapter device is established.

8. The method of claim 1, further comprising:
transmitting a first identification signal from the at least one first transmitter coupled to the first multimedia adapter device to an authentication server through the first multimedia adapter device for identifying first identity information of at least one first conference participant;
transmitting a second identification signal from the at least one second transmitter coupled to the second multimedia adapter device to the authentication server through the second multimedia adapter device for identifying second identity information of at least one second conference participant;
receiving the second identity information of the at least one second conference participant by the first multimedia adapter device through the authentication server for integrating the first identity information of the at least one first conference participant and the second identity information of the at least one second conference participant with the sharing image data; and
receiving the first identity information of the at least one first conference participant by the second multimedia adapter device through the authentication server for integrating the second identity information of the at least one second conference participant and the first identity information of the at least one first conference participant with another sharing image data.

9. The method of claim 1, further comprising:
transmitting a first request signal from the at least one first transmitter coupled to the first multimedia adapter device to at least one first computer;
transmitting first identity information of at least one first conference participant from the at least one first computer to the at least one first transmitter for identifying the first identity information of the at least one first conference participant by the at least one first transmitter;
transmitting a second request signal from the at least one second transmitter coupled to the second multimedia adapter device to at least one second computer; and transmitting second identity information of at least one second conference participant from the at least one second computer to the at least one second transmitter for identifying the second identity information of the at least one second conference participant by the at least one second transmitter.

10. The method of claim 1, further comprising:
displaying first identity information of at least one first conference participant and second identity information of at least one second conference participant on a first display coupled to the first multimedia adapter device;
wherein the first identity information of the at least one first conference participant is generated by executing a first software program installed in at least one first computer, the second identity information of the at least one second conference participant is generated by executing a second software program installed in at least one second computer, the first identity information and the second identity information comprise user login information, and the second identity information is transmitted to the first multimedia adapter device through the second multimedia adapter device.

11. The method of claim 1, further comprising:
transmitting a second control signal from the second multimedia adapter device to the first transmitter through the first multimedia adapter device according to the voice request signal; and
enabling a multimedia transceiver by the first transmitter according the second control signal.

12. The method of claim 1, further comprising:
controlling a part of first transmitters according to the voice request signal after the first transmitter of the at least one first transmitter is triggered.

13. The method of claim 1, further comprising:
establishing a link between an image capturing device and the first multimedia adapter device;
acquiring an image of the first conference room by the image capturing device;
transmitting the image of the first conference room from the image capturing device to the first multimedia adapter device;
displaying a sub-image of the image of the first conference room on a first display controlled by the first multimedia adapter device; and
transmitting the sub-image to the second multimedia adapter device.

14. The method of claim 13, further comprising:
transmitting the sub-image to a second display when a request signal of a second transmitter is authorized after the link between the image capturing device and the first multimedia adapter device is established.

15. The method of claim 1, further comprising:
generating a notification signal after the link control signal is transmitted from the first multimedia adapter device to the second multimedia adapter device directly or through the server according to the link list; and
transmitting the notification signal from the first multimedia adapter device to at least one second receiver coupled to the second multimedia adapter device;
wherein after the at least one second receiver receives the notification signal, when the at least one second receiver is triggered, the link between the first multimedia adapter device and the second multimedia adapter device is established, and the notification signal comprises a voice notification signal and/or a light notification signal.

16. The method of claim 1, further comprising:
receiving a multimedia signal transmitted from the at least one first transmitter by the first multimedia adapter device;
analyzing the multimedia signal by the first multimedia adapter device for determining if the multimedia signal comprises human voice information; and
generating the voice notification message to the visualized location image of at least one conference participant when the multimedia signal comprises the human voice information.

17. The method of claim 1, wherein the first multimedia adapter device comprises a first receiver and a first multimedia adapter box, the first receiver and the first multimedia adapter box support bi-directional communications, and triggering the first multimedia adapter device is triggering the first receiver, the first multimedia adapter box, or the at least one first transmitter coupled to the first receiver.

18. An image sharing and conference participant identification system comprising:
a first multimedia adapter device;
a second multimedia adapter device coupled to the first multimedia adapter device;
a first display coupled to the first multimedia adapter device; and
a second display coupled the second multimedia adapter device;
wherein after the first multimedia adapter device is triggered, a link control signal is generated, the first multimedia adapter device transmits the link control signal to the second multimedia adapter device directly or through a server according to a link list, a link between the first multimedia adapter device and the second multimedia adapter device is generated, the first multimedia adapter device transmits first image data to the second multimedia adapter device through the link for integrating the first image data and second image data by the second multimedia adapter device to generate sharing image data displayed on the second display, at least one first transmitter coupled to the first multimedia adapter device broadcasts a first position signal, the first multimedia adapter device detects a first position of the at least one first transmitter according to the first position signal, at least one second transmitter coupled to the second multimedia adapter device broadcasts a second position signal, the first second adapter device detects a second position of the at least one second transmitter according to the second position signal, information of the first position and the second position is embedded to the sharing image data for generating a visualized location image of at least one conference participant, a voice request signal is generated after a first transmitter of the at least one first transmitter is triggered, the voice request signal is transmitted from the at least one first transmitter to the first multimedia adapter device, and the first multimedia adapter device and a second multimedia adapter device are synchronized for embedding a voice notification message to the visualized location image according to the voice request signal, the first multimedia adapter device comprises a first receiver and a first multimedia adapter box, the second multimedia adapter device comprises a second receiver and a second multimedia adapter box, the at least one first transmitter and the first multimedia adapter device are disposed inside a first conference room, the at least one second transmitter and the second multimedia adapter device are disposed inside a second conference room, and the sharing image data is shared with participants of the first conference room and the second conference room by using bi-directional communications.

19. The system of claim 18, wherein a first control signal is generated after the first receiver or the at least one first transmitter coupled to the first receiver is triggered, the first receiver transmits the first control signal to the first multimedia adapter box through a first link, the first multimedia adapter box acquires the link list from an internal memory or from the server for generating the link control signal, the first multimedia adapter box acquires an Internet Protocol (IP) address of the second multimedia adapter device, or establishes the link between the first multimedia adapter device and the second multimedia adapter device by using the server.

* * * * *